(12) United States Patent
Takeda et al.

(10) Patent No.: US 6,443,644 B1
(45) Date of Patent: Sep. 3, 2002

(54) SPILL RESISTANT KEYBOARD

(75) Inventors: Toshisada Takeda, Simi Valley, CA (US); Nobuyuki Takahashi, Kanagawa (JP)

(73) Assignee: Minebea Co., Ltd., Tokyo (JP)

( * ) Notice: Subject to any disclaimer, the term of this patent is extended or adjusted under 35 U.S.C. 154(b) by 0 days.

(21) Appl. No.: 09/528,309

(22) Filed: Mar. 17, 2000

(51) Int. Cl.⁷ ............................................... H01H 13/70
(52) U.S. Cl. ...................... 400/490; 400/495; 400/496; 200/302.1; 200/302.2
(58) Field of Search ................................. 400/472, 490, 400/495, 496; 200/5 A, 306, 302.1, 302.2

(56) References Cited

U.S. PATENT DOCUMENTS

| | | | | |
|---|---|---|---|---|
| 4,468,145 A | * | 8/1984 | Denley | 400/496 |
| 4,626,639 A | * | 12/1986 | Bradford | 200/340 |
| 4,950,093 A | * | 8/1990 | Ertl | 400/496 |
| 5,003,140 A | * | 3/1991 | Abell | 200/344 |
| 5,117,074 A | | 5/1992 | Yanai et al. | |
| 5,172,805 A | | 12/1992 | Gumb | |
| 5,350,244 A | * | 9/1994 | Buttner | 400/496 |
| 5,421,659 A | | 6/1995 | Liang | |
| 5,642,950 A | | 7/1997 | Hochgesang et al. | |
| 5,668,358 A | * | 9/1997 | Wolf et al. | 200/345 |
| 5,669,723 A | * | 9/1997 | Chang | 400/496 |
| 5,681,122 A | | 10/1997 | Burke | |
| 5,810,491 A | | 9/1998 | Muller et al. | |
| 6,057,522 A | * | 5/2000 | Chao | 200/341 |
| 6,156,983 A | | 12/2000 | Chen et al. | |
| 6,239,391 B1 | * | 5/2001 | Nishijima et al. | 200/5 A |

* cited by examiner

*Primary Examiner*—Andrew H. Hirshfeld
*Assistant Examiner*—Ken D. Williams
(74) *Attorney, Agent, or Firm*—Juel Lutzker; Donna Angotti; Schulte Roth & Zabel, LLP

(57) ABSTRACT

The present invention relates to a spill resistant keyboard including at least one conduit to permit a spilled liquid to drain through the keyboard without damaging the keyboard's electronics. The conduit is positioned along a sloped surface located along a front edge of a recessed area of the keyboard to promote the drainage of the spilled liquid through the conduit. The keyboard also includes water protection walls positioned around certain elongated keys prevent the spilled liquid from entering the body of the keyboard.

9 Claims, 3 Drawing Sheets

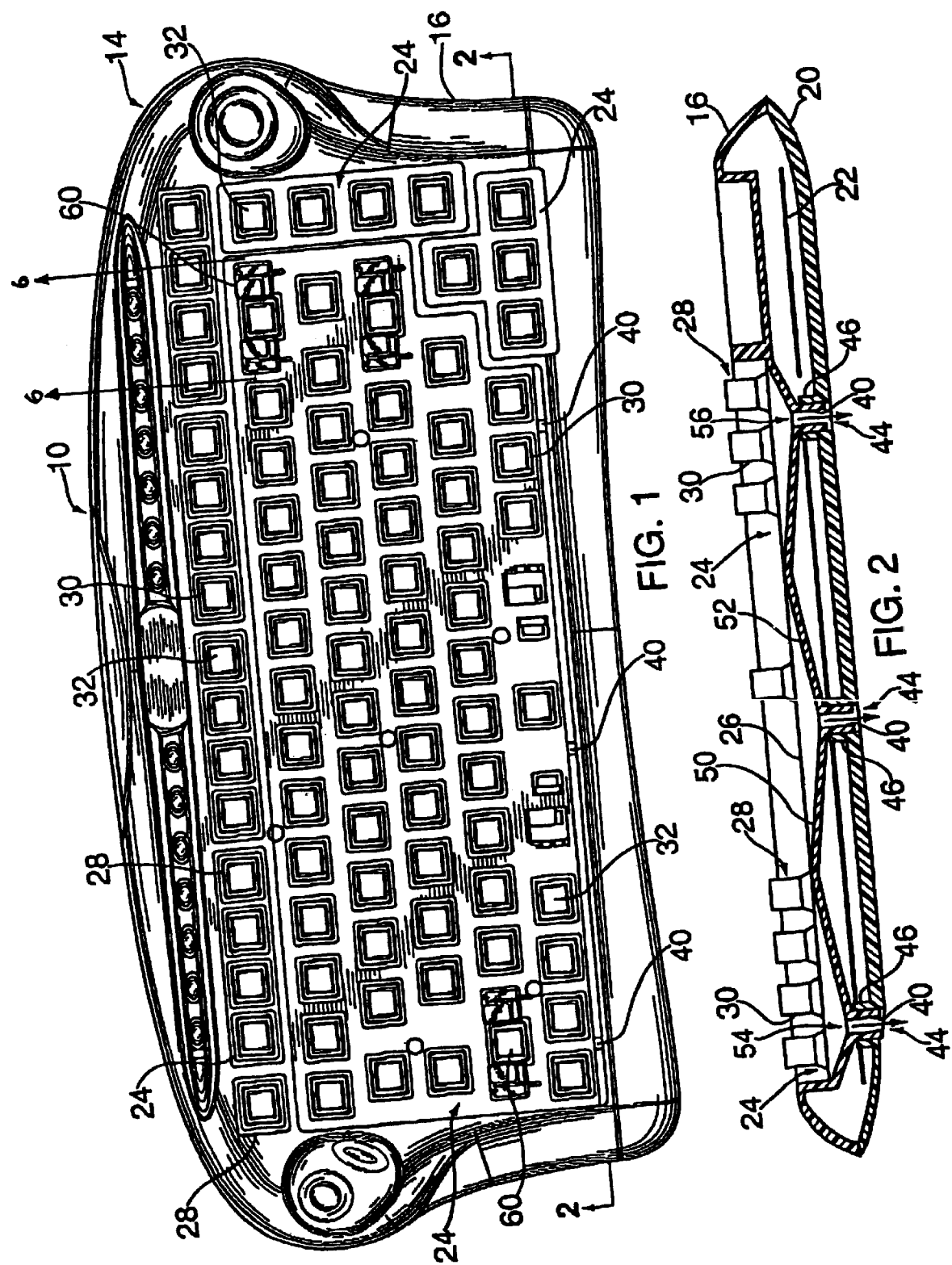

SPILL RESISTANT KEYBOARD

BACKGROUND OF THE INVENTION

1. Field of the Invention

The present invention is generally directed to a keyboard and more particularly to a spill resistant keyboard.

2. Description of the Prior Art

Keyboard assemblies having a waterproof effect are well known in the prior art. Typically, these prior art designs incorporate one or more passages in the body of the keyboard that permit a spilled liquid to drain out through the keyboard without damaging the electronic components contained therein. However, these prior art designs are sometimes ineffective since water or other liquid which may spill on a keyboard may collect along the edges of the keyboard without necessarily exiting through the provided water passages.

These prior art designs also fail to recognize that in a typical keyboard used with a personal computer certain elongated keys (e.g., backspace key, shift key, enter key) are mounted to the body of the keyboard assembly by means of an equalizing wire which is anchored into the keyboard body within certain holes or bores provided in the keyboard body adjacent the elongated key. These holes in the keyboard body inadvertently provide a passage through which a spilled liquid may drain into the interior of the keyboard thereby damaging the sensitive electronic components housed therein.

Thus a need continues to exist for a spill resistant keyboard which ensures that a spilled liquid is completely drained from the keyboard without damaging the keyboard.

SUMMARY OF THE INVENTION

Accordingly, it is an object of the invention to provide a keyboard which includes one or more drain passages which extend through the body of a keyboard for allowing a spilled liquid to drain from the keyboard without causing damage to any of the electronic components of the keyboard.

It is a further object of the invention to configure the keyboard to promote the flow of a liquid spilled on the keyboard body through the water passages.

It is still a further object to provide water protection walls which prevent water from entering the body of the keyboard through holes provided in the body of the keyboard to support the elongated keys.

In accordance with one aspect of the invention, there is provided a spill resistant keyboard which comprises a top enclosure and bottom enclosure joined together to define a keyboard housing. The top enclosure includes at least one recessed area having a bottom support wall which includes a plurality of key cap housings adapted to receive and slidably mount a plurality of key caps. The key cap housings include an upstanding wall extending upwardly from the bottom support wall and define therein a first barrier to a spilled liquid. The bottom support wall further includes a leading edge which defines at least one sloped or pitched surface with respect to the bottom support wall to promote the drainage of a spilled liquid. At least one conduit is positioned along the sloped or pitched surface of the leading edge and extends from the pitched surface to the bottom enclosure. The bottom enclosure include at least one hole or bore for mating with at least a portion of the at least one conduit thereby allowing any spilled liquids to drain through the keyboard housing through the at least one conduit without damaging any electronic components.

BRIEF DESCRIPTION OF THE DRAWINGS

These and other objects, features and advantages of the invention, its construction and operation will be best understood from the following detailed description, taken in conjunction with the accompanying drawings, of which:

FIG. 1 is top plan view of a keyboard without the key caps;

FIG. 2 is cross sectional view taken along the line 2—2;

DETAILED DESCRIPTION OF THE PREFERRED EMBODIMENT

Figure 3:
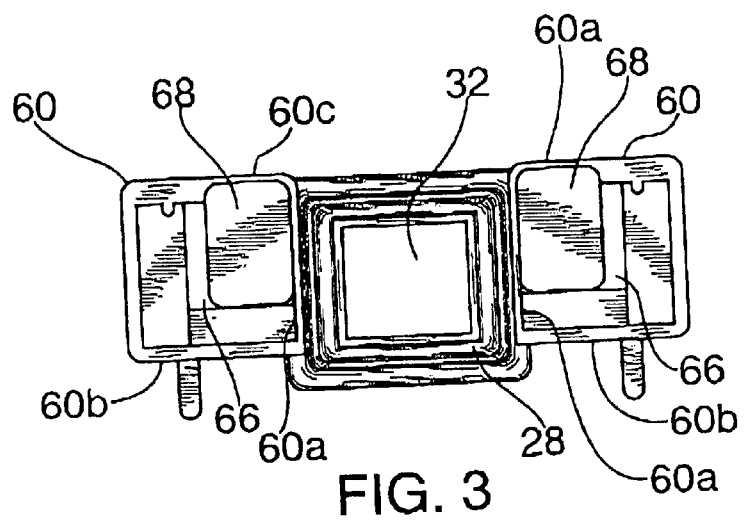
FIG. 3 is a top view of a key cap housing with water protection walls in accordance with a second aspect of the invention.

Referring now to the drawings, a spill resistant keyboard in accordance with a preferred embodiment of the present invention is disclosed in FIGS. 1 through 3. As shown in FIGS. 1 and 2, the keyboard 10 is comprised of a keyboard housing 14 having a top enclosure 16 and a bottom enclosure 20. In the space between the top and bottom enclosures 16, 20 of the keyboard housing 14 are located the electronic components (not shown) of the keyboard 10. This area also includes a membrane 22 having a plurality of switch domes which resiliently support the key caps 72. For ergonomic reasons, the top enclosure 16 of keyboard housing 14 is preferably disposed at a downward incline with respect to the supporting surface on which the keyboard 10 is placed. As a result, a spilled liquid will drain from the top edge toward the front edge of the keyboard 10.

The top enclosure 16 of keyboard housing 14 includes a plurality of recessed areas 24. Each recessed area has a bottom supporting wall 26 which supports a plurality of key cap housings 28. The bottom supporting wall 26 is also downwardly inclined. The key cap housings 28 may be integral with the bottom support wall 26 or may be separately mounted thereto. Whether integral with the bottom support wall or mounted thereto, the key switch housings 28 should form a first barrier to spill liquids. Specifically, each key cap housing 28 includes an upstanding wall 30 (or walls) which extends upwardly from the bottom support wall 26 initially preventing any spilled liquid from entering the interior of the keyboard housing where the sensitive electronics are housed. Each key switch housing 28 includes a center opening 32 defined by the upstanding wall 30 into which is slidably mounted a key cap 72, as is well known in the art. The key caps 72, for example, are arranged using the well know QWERTY key configuration.

As shown in FIG. 2, each recessed area 24 includes one or more passages or conduits 40 which extend downwardly from the bottom support wall 26 toward the bottom enclosure 20. The bottom enclosure 20 includes one or more openings or holes 44 which are positioned along a bottom wall of the bottom enclosure 20 to correspond with each one or more conduits 40. Each hole 44 receives at least a portion of a corresponding conduit 40. In a preferred embodiment, the holes or bores 44 are circumscribed by an upstanding wall or collar 46 which tightly receives the leading edge of the conduit 40 to further ensure that a spilled liquid will drain through the conduit and out through the bore 44 in the direction of the arrows shown in FIG. 2 onto the surface which supports the keyboard 10. Alternatively, the conduits 40 may be formed in the bottom enclosure and extend upwardly to be similarly received in openings formed in the top enclosure 16.

Since the top enclosure 16 and the bottom wall 26 are preferably inclined toward the front edge of the keyboard 10, a spilled liquid runs off in the direction of the front edge of the keyboard 10. Accordingly, the conduits 40 are disposed along the front edge of each of the recessed areas 24. To further promote drainage of spilled liquid, at least a portion of the front edge of each of the recessed areas includes at least a second sloped surface 50 with respect to the sloped bottom support wall 26. The second sloped surface 50 may be inclined either in the same direction as the incline of the bottom support wall 26 or transverse thereto as shown in FIG. 2. The conduits 40 are preferably located in the front edge of the recessed area 24 and along the second sloped surface 50 to promote the drainage of spilled liquids and obviate the collection of the liquids within the recessed areas 24. As shown in FIG. 2, in the preferred embodiment the conduits 40 are disposed between pairs of sloped surfaces 50, 52 forming a series of V-shaped valleys. The outermost V-shaped valleys 54, 56 ensure that spilled liquids run off the top enclosure 16 and do not collect or pool along the edges of the recesses 24.

In a further aspect of the invention, water protection walls 60, are configured on the bottom support wall 26 of each of the recesses 24 which includes an elongated key 74 (e.g., backspace key, shift key, enter key) (not shown). As is known in the art, elongated keys 74 are supported by the use of an equalizing wire 76, not shown, which is anchored to the bottom support wall by means of one or more holes 66 which are provided in the bottom support wall. A top wall 68 which extends over the holes 66 is also provided to help anchor the equalizing wire to the bottom support wall 26. Other similar means are known for securing the equalizing wire 76 to the keyboard. The equalizing wire 76 improves the feel of thee elongated keys 74, particularly, around their corners when depressed by a user.

Figure 4:
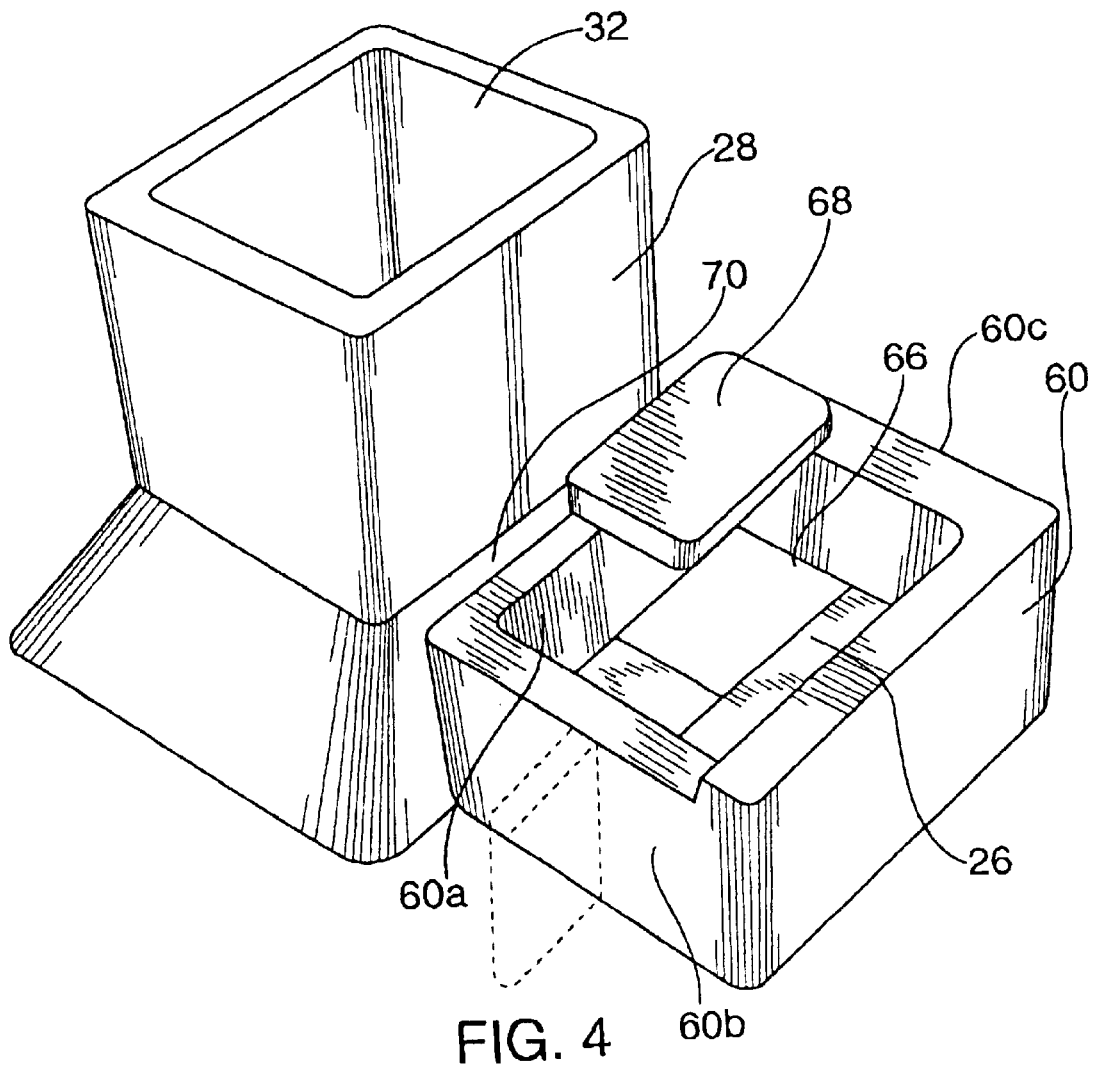
FIG. 4 is a detailed view of a portion of the key cap housing and water protection walls of FIG. 3.
Figure 5:
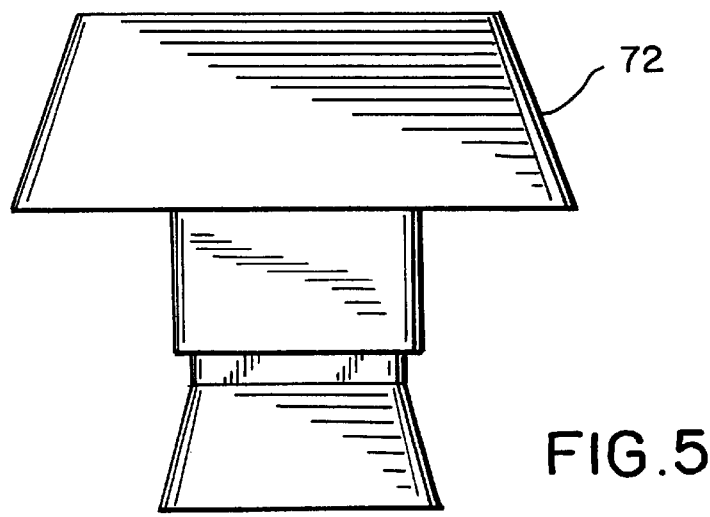
FIG. 5 is a side view of a key cap slidably mounted to a keycap housing.
Figure 6:
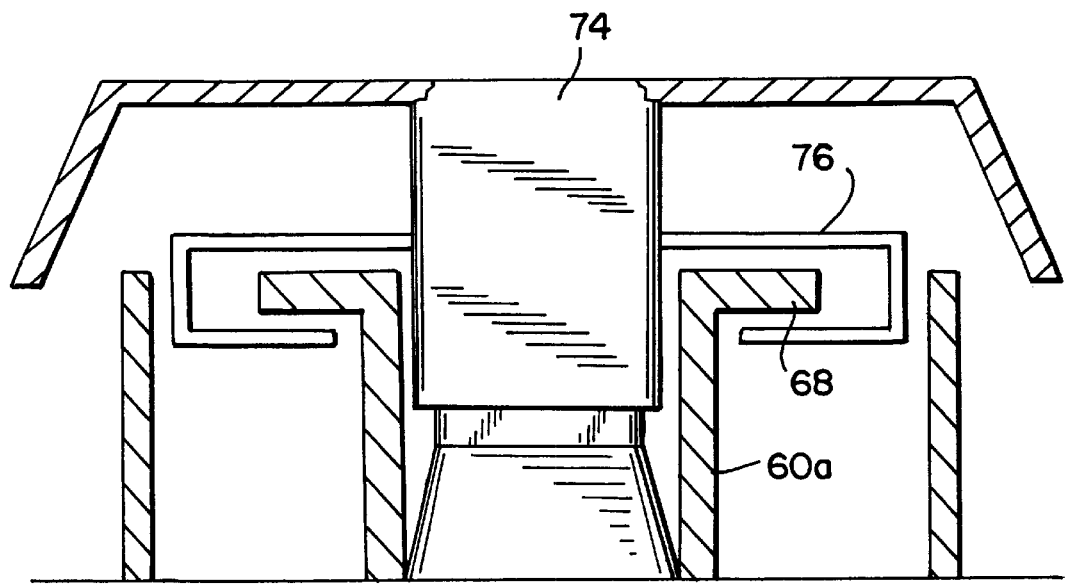
FIG. 6 is a cross-sectional view of an elongated key mounted to a key cap housing taken along the line 6—6.

The holes 66 used to anchor the equalizing wire 76 provide an unintended passage for spilled liquids to drain into the keyboard housing thereby damaging the sensitive electronic components contained therein. As shown in FIGS. 3 and 4, the water protection walls 60 extend upwardly from the bottom support wall 26 and surround the holes 66 on opposite sides of the key cap housing 28 to prevent liquids from entering into the keyboard housing 14. Preferably, at least one welter protection wall segment 60a abuts the key cap housing 28, as shown if FIG. 4. However, alternatively, water protection wall 60a may be omitted and the external wall 70 of the key cap housing 28 may be used as a water protection wall 60. In such a configuration, the ends of water protection wall segments 60b and 60c are directly connected to external wall 70 of key cap housing 28. The water protection walls 60 should be as high as possible without touching the key cap after if has been depressed.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

What is claimed is:

1. A spill resistant keyboard comprising:
   a keyboard housing including a top enclosure and a bottom enclosure,
   said top enclosure including at least one recessed area having a bottom wall, the bottom wall supporting at least one key cap housing adapted to receive and mount a key cap;
   said at least one key cap housing having an upstanding wall extending upwardly from said bottom wall of said top enclosure;
   said bottom wall including a back edge, a front edge, a first surface extending between said back edge and said front edge, and a second surface extending adjacent to said front edge;
   said bottom enclosure including at least one hole; and
   at least one conduit located along said front edge and disposed between said second surface and said at least one hole;
   wherein said first surface has a first slope such that a spilled liquid flows from said back edge toward said front edge, wherein said second surface is located substantially below said first surface, wherein said second surface has a second slope in a direction defined from said top enclosure to said bottom enclosure, and wherein said at least one hole receives at least a portion of said at least one conduit.

2. The keyboard of claim 1 wherein said bottom wall includes at least two of said second surfaces which form a V-shaped valley and wherein said at least one conduit is located adjacent a lower most portion of said V-shaped valley.

3. The keyboard of claim 2 wherein said bottom wall includes a plurality of said V-shaped valleys, each of said plurality of V-shaped valleys having a conduit adjacent a lower most portion of said each V-shaped valley.

4. The keyboard of claim 1 wherein a collar circumscribes said at least one hole.

5. The keyboard of claim 1 further comprising at least one elongated key cap mounted on said top enclosure, said top enclosure having a means to mount said elongated key cap, including at least one mounting hole disposed in said top enclosure and a water protection wall extending upwardly from said bottom wall of said top enclosure and surrounding said mounting hole to prevent a spilled liquid from entering said keyboard housing.

6. The keyboard of claim 1 wherein said second slope is inclined in a direction traverse to said first slope.

7. The keyboard of claim 6 wherein said second slope is such that a spilled liquid flows in a direction having a first component from the top enclosure to the bottom enclosure and a second component along said front edge.

8. A keyboard comprising:
   a bottom enclosure and a top enclosure joined together to form a keyboard housing;
   said top enclosure including at least one recessed area having a bottom wall for supporting at least one key cap housing adapted to receive and mount a key cap;
   said key cap housing having an upstanding wall extending upwardly from said bottom wall;
   said bottom wall including a back edge, a front edge, a first surface extending between said back edge and said front edge, and a second surface extending adjacent to said front edge;
   at least one elongated key cap mounted to said keyboard within said at least one recessed area;
   an equalizing wire for mounting and supporting said elongated key cap to said keyboard;
   means for mounting said equalizing wire, said means including at least one mounting hole disposed in said at least one recessed area of said top enclosure;

a water protection wall extending upwardly from said recessed area and surrounding said at least one mounting hole to prevent a spilled liquid from entering said keyboard housing;

said bottom enclosure including at least one hole; and at least one conduit located along said front edge and disposed between said second surface and said at least one hole;

wherein said first surface has a first slope such that a spilled liquid flows from said back edge toward said front edge, wherein said second surface is located substantially below said first surface, wherein said second surface has a second slope in a direction defined from said top enclosure to said bottom enclosure, and wherein said at least one hole receives at least a portion of said at least one conduit.

9. A keyboard having at least one elongated key cap, comprising:

a keyboard body having at least one recessed area for mounting said at least one key cap;

at least one elongated key cap mounted to said keyboard body within said at least one recessed area;

an equalizing wire for mounting and supporting said elongated key cap;

a first hole disposed in said at least one recessed area, said first hole being configured for mounting said at least one key cap;

at least one second hole disposed in said at least one recessed area, said second hole being configured for mounting said equalizing wire; and a water protection wall extending upwardly from said recessed area and surrounding said at least one second hole to prevent a spilled liquid from entering said keyboard body.

* * * * *